US008811175B2

(12) United States Patent
Sharma et al.

(10) Patent No.: US 8,811,175 B2
(45) Date of Patent: Aug. 19, 2014

(54) CLOSED-LOOP QOS CONTROL USING CHARGING GROUPS

(75) Inventors: Ranjan Sharma, New Albany, OH (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 119 days.

(21) Appl. No.: 13/432,148

(22) Filed: Mar. 28, 2012

(65) Prior Publication Data
US 2013/0258849 A1 Oct. 3, 2013

(51) Int. Cl.
*H04W 28/10* (2009.01)
(52) U.S. Cl.
USPC ........... 370/235; 370/232; 370/231; 370/328; 370/252
(58) Field of Classification Search
USPC ........................................................ 370/235
See application file for complete search history.

(56) References Cited

U.S. PATENT DOCUMENTS

| | | | | |
|---|---|---|---|---|
| 7,957,314 B2* | 6/2011 | Andreasen et al. | ........... | 370/252 |
| 2010/0010922 A1* | 1/2010 | Foottit et al. | ..................... | 705/30 |
| 2010/0142373 A1* | 6/2010 | Jin et al. | ......................... | 370/230 |
| 2010/0214977 A1* | 8/2010 | Hegde | ............................. | 370/328 |
| 2010/0223222 A1* | 9/2010 | Zhou et al. | ....................... | 706/47 |
| 2012/0002548 A1* | 1/2012 | Walstrom | ........................ | 370/235 |
| 2012/0092990 A1* | 4/2012 | Tapia et al. | ..................... | 370/232 |
| 2012/0099715 A1* | 4/2012 | Ravishankar et al. | ... | 379/114.01 |
| 2012/0140632 A1* | 6/2012 | Norp et al. | ..................... | 370/235 |
| 2013/0114408 A1* | 5/2013 | Sastry et al. | ................... | 370/231 |
| 2013/0188554 A1* | 7/2013 | Cai et al. | ........................ | 370/328 |

OTHER PUBLICATIONS

3rd Generatiom Partnership Project; Policy and charging control architecture, Mar. 2010, (3GPP TS 23.203 version 9.4.0 Release 9).*

* cited by examiner

*Primary Examiner* — Ian N Moore
*Assistant Examiner* — Lakeram Jangbahadur
(74) *Attorney, Agent, or Firm* — Carmen Patti Law Group, LLC (57) ABSTRACT

A method and apparatus for providing Quality of Service (QoS) gating and control as a function of quota consumption by a group of users is disclosed. A feedback mechanism for QoS gating and control with an Offline Charging System (OFCS) is also provided. In a packet telecommunication network, the Policy Charging and Control architecture is modified to include an Aggregation Interface Function that dynamically collects usage quantum for users in real time. The Aggregation Interface Function proactively seeks user group information and aggregates usage quantum over an entire group to prevent surprise overage charges at billing.

13 Claims, 5 Drawing Sheets

CLOSED-LOOP QOS CONTROL USING CHARGING GROUPS

FIELD OF THE INVENTION

The invention relates generally to wireless communication systems and more particularly to managing Quality of Service (QoS) and gating control for both online charging and offline charging systems aggregated across user groups with a view to contain user expenses.

BACKGROUND

As wireless telecommunication networks have evolved and expanded, there has been an ever-increasing need to manage the ways in which users are charged for their wireless device usage. With the advent of smart mobile devices that are capable of putting a much bigger burden on the telecommunications network through data access and streaming, there is a need to provide management of network usage that can control access to the network in real-time, particularly with regard to data consumption. This includes everything from always-on internet access to streaming of videos and applications like games.

Users may pay for their access to wireless networks in both prepaid and post-paid billing systems. The wireless network includes several logical functions to handle these systems. The vast majority of subscribers use post-paid billing which is handled by an Offline Charging System (OFCS) that transfers charging information to a Billing Domain (BD) where it is processed. Prepaid billing is handled by an Online Charging System (OCS) which may also forward charging information to the BD is a similar way.

With the increasing usage of network resources, service providers (SP) are actively pushing tiered data consumption limits. A tiered plan allows mobile device users to get their data at one rate up to a given quota limit, and at a different rate with a second quota limit. In some alternate cases, the SP may degrade the Quality of Service (QoS) after the first quota limit and provide unlimited data consumption with the degraded QoS till the end of the billing cycle.

While the QoS gating upfront with an OCS is relatively straightforward, there are no easy alternatives for the post-paid subscribers, as OCS is not in the call-control or data delivery path for them. Additionally, even with OCS, while QoS gating can be effectively applied on individual subscribers and sessions, there is no concept of applying it on a group basis. Examples of the group-based QoS gating would include enterprise users on a business usage plan, and members of a family on a personal usage plan.

Therefore, what is needed is a method and apparatus for QoS and gating control with an offline charging system (OFCS). There is also a need to QoS and gating control as a function of quota consumption by a group of users.

SUMMARY

Embodiments of the present invention disclose a method and apparatus for providing Quality of Service (QoS) gating and control for as a group of users. The method and apparatus also provides a feedback mechanism for use with an Offline Charging System (OFCS).

In one embodiment, there is provided a method for providing quality of service (QoS) control in a telecommunications network including the steps of detecting a new service data flow (SDF), initiated by a user equipment (UE), in the telecommunications network), requesting information regarding membership of the UE in a group, initializing one or more counters to monitor telecommunications network usage by the initiating UE and any other UEs in the same group, collecting telecommunications network usage data by the initiating UE and any other UEs in the same group in the one or more counters, comparing the one or more counters to pre-defined thresholds and changing QoS when any pre-defined threshold of the one or more counters is reached.

In a further embodiment, there is provided a method for providing quality of service (QoS) control in an LTE wireless telecommunications network including the steps of receiving a Charging Data Record (CDR) from an OFCS or an OCS, said CDR generated in response to an Accounting Request (ACR) or Credit-Control Request (CCR), said CDR indicating a new service data flow (SDF) for a first user equipment (UE) on the LTE network, requesting information regarding membership of the first UE in a group, if the requested information indicates that the first UE is in a group, receiving a list of one or more additional UEs in the group, initializing one or more counters to monitor LTE network usage by the first UE and the one or more additional UEs in the group, if another CDR is received for the SDF, updating the appropriate counter of the one or more counters monitoring the one or more UEs in the group, comparing the one or more counters to pre-defined thresholds, notifying a user profile repository when any pre-defined threshold of the one or more counters is reached and changing the QoS for the one or more UEs in the group in response to notifications.

Some embodiments of the above methods further include wherein the telecommunications network is an LTE network having a Subscriber Profile Repository (SPR) or a UDR, a Policy and Charging Rules Function (PCRF), an Online Charging System (OCS) and an Offline Charging System (OFCS) which interact to provide QoS, gating control and billing data for subscribers using the telecommunications network.

Some embodiments of any of the above methods further include wherein the step of detecting a new SDF further comprises the step of executing the policy defined at a Policy and Charging Rules Function (PCRF) and executed at a Policy and Charging Enforcement Function (PCEF), such that an SDF is uniquely identified for usage tracking via establishing a service data container at the PCEF to track the uplink and downlink data consumptions and communicating with an Offline Charging System (OFCS) or an Online Charging System (OCS) periodically via sensing an accounting request (ACR) carrying the consumed quota associated with the container in the SDF.

Some embodiments of any of the above methods further include wherein the step of changing QoS further comprises sending a notification that a threshold has been reached to the SPR or the PCRF.

Some embodiments of any of the above methods further include the steps of sending a notification to a user profile repository when a counter reaches a pre-defined threshold and updating a QoS Class Identifier (QCI) in the user profile repository in response to the notification.

Some embodiments of any of the above methods further include wherein the pre-defined thresholds are selected by a subscriber and maintained by a service provider of the telecommunications network.

Some embodiments of any of the above methods further include wherein the one or more counters may be flexibly assigned to monitor LTE network usage by a single UE in the group via a single SDF.

Some embodiments of any of the above methods further include wherein one or more of the counters may be flexibly assigned to monitor LTE network usage by a plurality of UEs in the group via a single SDF.

Some embodiments of any of the above methods further include wherein the one or more counters may be flexibly assigned to monitor LTE network usage by a single UE in the group to a plurality of SDFs.

Some embodiments of any of the above methods further include wherein the pre-defined thresholds are selected by a subscriber and maintained by a service provider of the telecommunications network.

In another embodiment, there is provided an apparatus for providing quality of service (QoS) control in a telecommunications network coupled to one or more user equipments (UEs), including an aggregation module for receiving a notification of a new or continuing data session by one of the UEs, an interface module for accessing information which indicates whether the UE which generated the notification is part of a group of UEs and communicating the group information to the aggregation module and one or more counters which are initialized or updated by the aggregation module, in response to the notification, to track the data session and the information from the interface module, said counters associated with one or more quotas, wherein said aggregation module informs said interface module when a counter has reached its associated quota, thereby changing the QoS experienced by the UE.

Some embodiments of the above apparatus may further include wherein the notification of a new or continuing data session further comprises a charging data record (CDR) associated with a session.

Some embodiments of the above apparatus may further include wherein the interface module sends a notification to a user profile repository when a counter reaches a pre-defined threshold and the user profile repository updates a QoS Class Identifier (QCI) in response to the notification.

Some embodiments of the above apparatus may further include wherein the pre-defined thresholds are selected by a subscriber and maintained by a service provider of the telecommunications network.

Some embodiments of the above apparatus may further include wherein the telecommunications network is an LTE network having a Subscriber Profile Repository (SPR), a Policy and Charging Rules Function (PCRF), an Online Charging System (OCS) and an Offline Charging System (OFCS).

Some embodiments of the above apparatus may further include wherein the CDRs are received from the OCS and the OFCS, and changing QoS performed in the SPR or the PCRF.

DESCRIPTION OF THE DRAWINGS

Features of example implementations of the invention will become apparent from the description, the claims, and the accompanying drawings in which:

DETAILED DESCRIPTION

Telecommunications networks are increasingly being accessed with user equipment that can send and receive data in addition to the voice calls that have always been transmitted. The transmission of data puts a much greater demand for bandwidth on the network than voice. With the increasing usage of network resources, service providers (SP) are actively pushing tiered data consumption limits. This means measuring a user's data consumption in real time and changing the user's access to the network when certain limits are reached. For example, a user may have a limit of allowing only a certain number of minutes of video streaming per day or per billing cycle. Data consumption may also be limited based on the type of application, for example, games. Data consumption may also be limited by throttling, which provides a higher bandwidth for a certain period of time then drops to a lower bandwidth when a limit is reached.

Group-based QoS control may take many forms. For example, in a family, some members may have less restrictive limits than others. It is difficult, if not impossible, for the owners of a group account to monitor the usage of all the members and there is a need to provide this monitoring in the network itself.

Figure 1:
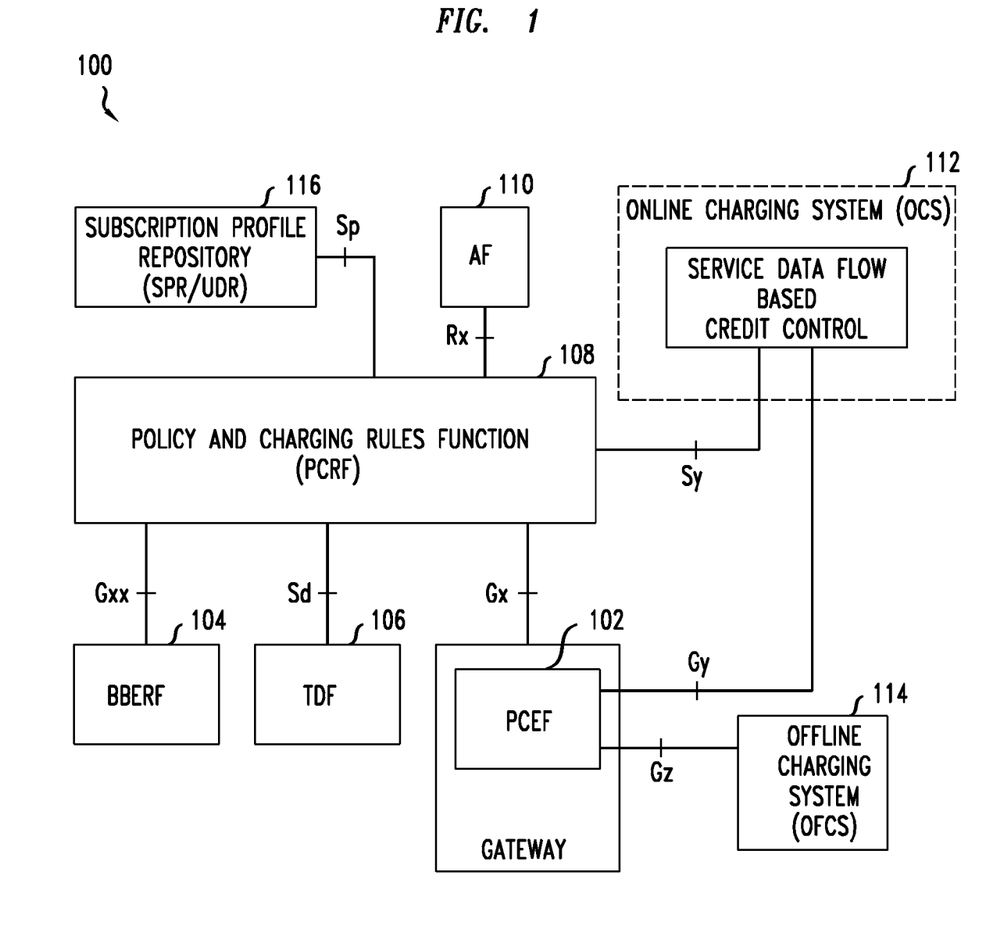
FIG. 1 is a diagram illustrating a Policy Charging and Control (PCC) architecture for a telecommunications network.

In a preferred embodiment, QoS gating and control is implemented in a LTE (Long Term Evolution) wireless network. In this network, monitoring of network usage is accomplished by the Policy Charging and Control (PCC) architecture 100, shown in FIG. 1. This architecture includes the functions of the Policy and Charging Enforcement Function (PCEF) 102, the Bearer Binding and Event Reporting Function (BBERF) 104, the Traffic Detection Function (TDF) 106, the Policy and Charging Rules Function (PCRF) 108, the Application Function (AF) 110, the Online Charging System (OCS) 112, the Offline Charging System (OFCS) 114 and the Subscription Profile Repository (SPR) 116 or User Data Repository (UDR). Note that FIG. 1 shows the "at home" architecture for PCC for a subscriber. Without deviating from the spirit of this invention, the presented solution is equally applicable to roaming subscribers as well.

SPR (or UDR) 116 holds subscription information for individual users, which is accessed by PCRF 108 on the Sp reference point. This subscription information provides the transport level policies to be used while establishing an IP-CAN session (IP Connectivity Access Network) for a given subscriber ID and a packet data network (PDN) identifier. The subscriber information also provides other attributes associated with the data session, for example, the QoS Class identifier (QCI). The subscriber ID can be the IMSI related to the subscriber's mobile device. The Sp reference point allows SPR 116 to notify PCRF 108 if and when the subscription information has changed, assuming PCRF 108 has indicated to SPR 116 that such changes are of interest to PCRF 108. PCRF 108 can also cancel the update notifications by sending a cancellation notification to SPR 116.

In addition, SPR 116 also holds subscription data relative to the usage control criteria for Close User Group (CUG) consisting of family/friends or an enterprise group. Managing data consumption for a CUG can avoid group/family bill shock at the end of a billing cycle by pooling allocated thresholds and providing QoS and gating control on a group basis instead of or in addition to an individual basis.

For a CUG, the criteria for QoS and gating control, or throttling, are provisioned at the SPR. It is not necessary for a uniform policy to be applied in the entire CUG; instead, differential or tiered service levels may be allocated within the CUG. Thus, the QoS modulation criteria can be applied in conjunction with the currently allocated QoS for individual group members, which may in turn depend on hierarchy levels and usage levels. For example, for members belonging to the same CUG with identical QCI, the service provider can upgrade QoS or discount the rate for given QoS; for members within the same CUG but with different pre-allocated QCI, the service provider will grant different upgrade or discount rates; in the same group, different members (e.g., parents and children) could be configured with different privileges. Further, it may be decided that even in case of throttling, members with a guaranteed service level at or above a threshold (generally denoted by a QCI or QCI-like identifier) would not experience any downgrade.

PCC architecture 100 works at the service data flow (SDF) level. The PCC rules are established at PCRF 108 and implemented/executed at PCEF 102. When a subscriber initiates a session to an Access Point Name (APN, which is an instance of PDN), PCEF 102 detects traffic and checks if a corresponding service data flow container exists for this traffic. If none is found, then PCEF 102 creates a new service data flow container for this session and maintains quota consumption figures for both uplink as well as downlink. PCEF 102 sends the information on quota consumption to OFCS 114 upon the arrival of a trigger, which, for the sake of simplicity can be stated as a volume-limit trigger or time-limit trigger, while noting that there are several other criteria for triggering PCEF 102 to inform OFCS 114 about the consumed quota. When the user disconnects from an APN, PCEF 102 once again examines if the container associated with the service data flow can be closed, if indeed there are no other flows that match the service data flow tallied by the said container. When the container is closed, PCEF 102 would inform OFCS 114 via an accounting request provided this was the only container being tracked for the subscriber If there are multiple containers open for a subscriber session, then the closure of a SDF is reported via a scheduled mechanism (e.g., driven by the value set in Acct-Interim-Interval AVP used for tracking session heartbeats). PCRF 108 is responsible for rule authorization that selects the QoS parameters with a session. PCRF 108 can also generate dynamic PCC rules for service data flows.

Figure 2:
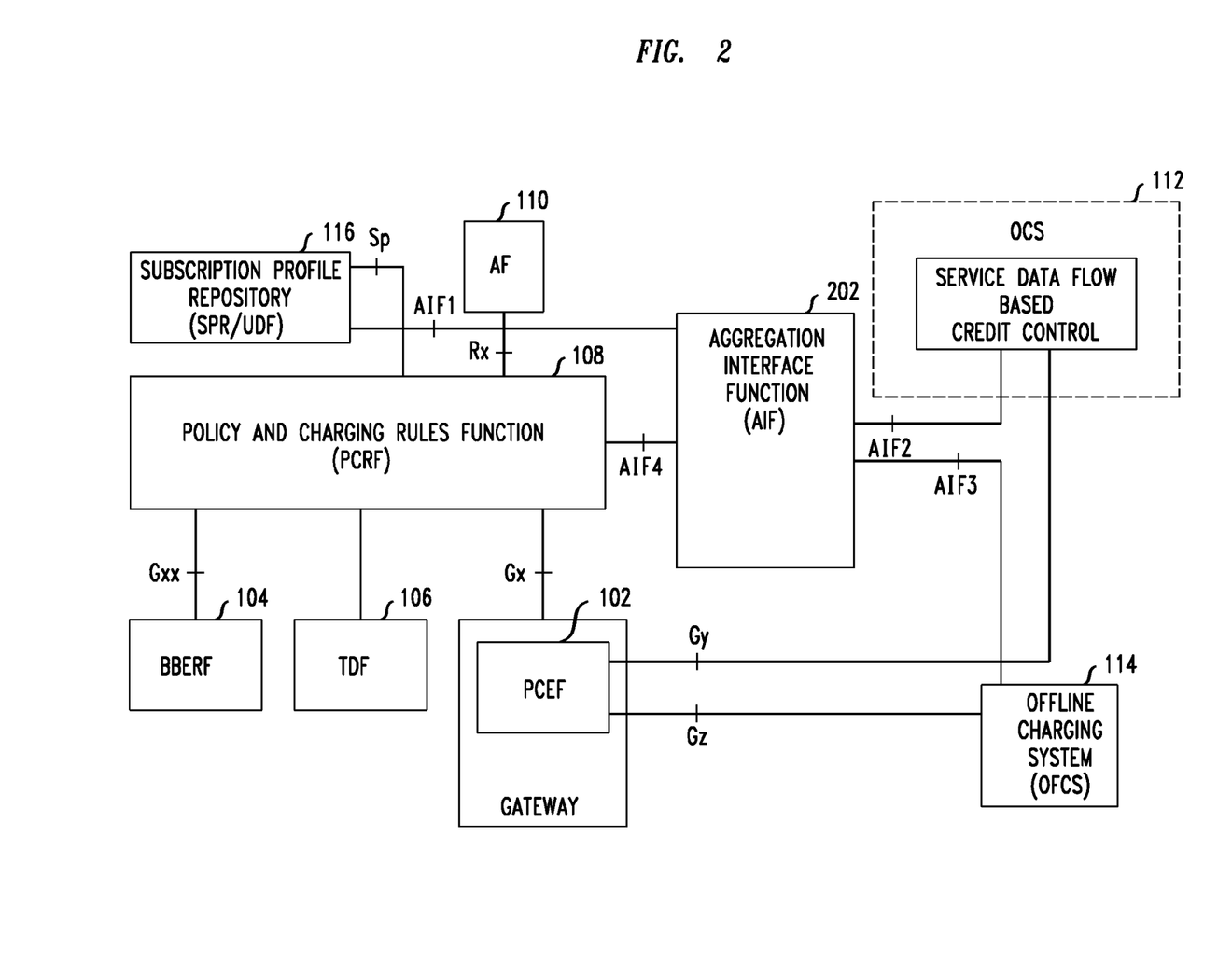
FIG. 2 is a diagram illustrating a PCC architecture including an Aggregation Integration Function.

FIG. 2 illustrates PCC architecture modified to include Aggregation Interface Function (AIF) 202 which provides improved QoS and gating control according to the current embodiment. AIF 202 interfaces with SPR 116 over an AIF1 interface, with OCS 112 over an AIF2 interface, with OFCS 114 over an AIF3 interface and with PCRF 108 over an AIF4 interface. Aggregation Interface Function (AIF) 202 will dynamically collect user(s) data consumption and aggregate either online and offline charging data in real time. The AIF 202 will proactively seek user and user group info from SPR (or UDR) 116 for billing plans, thresholds and upgrade criteria. According to a preferred embodiment, the AIF application proactively checks CUG data to determine whether to dynamically alter the charging policies towards PCRF 108.

AIF 202 is responsible for keeping usage quantum tallied on a per-subscriber basis, getting subscriber information from SPR 116 and group information from SPR 116 or OCS 112 or other places, getting per session quantum consumption from either OCS 112 or OFCS 114, or both, and modifying SPR 116 information as quota is depleted for a group as a result of subscriber-level quota consumption during a billing cycle. PCRF 108 may query AIF 202 for aggregated subscriber or group users' usage quantum data; or AIF 202 can push aggregated subscriber or group users' usage quantum data to PCRF 108 for policy updating. PCRF 108 will cache subscriber or group users' usage quantum data for ongoing IP-CAN sessions.

This is further detailed in several examples given below.

Based on changes to the QCI in SPR 116 due to input from AIF 202, SPR 116 provides updates to PCRF 108, (alternatively, PCRF 108 may gather data directly from AIF 202 and make policy determination), which in turn may modify the QoS associated with a service data flow to an end-user terminal, depending on several cases:

Case 1: For sessions that begin at the start of a billing cycle, the QCI associated with a subscriber-originated service data flow would be as originally provisioned in SPR 116 and available at PCRF 108.

Case 2: For sessions that begin at any point during a billing cycle when some of the agreed upon quota has been consumed, SPR 116, under the instruction of AIF 202, would modify the QCI to associate a different QoS with a subscription. This would apply to all members of the group identified at AIF 202 from information available at OCS 112 or another equivalent place.

Case 3: For subsequent sessions that begin before the end of the billing cycle, the associated QCI for a given group of users may be modified a few more times, depending on the tiered usage pattern a service provider wishes to implement.

Case 4: Sessions that straddle the billing interval may suddenly be boosted to their original QCI from a previously downgraded QoS.

The following examples illustrate some possible uses for the AIF application:

Example 1

Changing QoS for Individual User Connection when Daily Quota is Reached

Alice subscribes to a data plan that gives her a daily data consumption limit of 1 GB and a maximum d/1 bandwidth of 8 Mbps. When the daily quota has been consumed, the bandwidth is downgraded to limited to 512 Kbps Example 2

Blocking Certain Services when a Quota is Reached

Bob subscribes to an unlimited data plan, but restricted video streaming, which is limited to 15 minutes of viewing per day. When the daily viewing limit is reached, any ongoing video streams are downgraded to 64 Kbps and any new video streaming sessions are blocked.

Example 3

Modifying QoS for all Members of a Group when a Limit of the Group Quota has been Reached In this case, Alice and Bob are assumed to be part of the same family, with quota restrictions applicable to both of them as a group. Based on usage data aggregated during the billing cycle, Alice and Bob's quota could vary based on pre-configured member policy, and incur additional restrictions.

Example 4

Handling a scenario where part of the subscriber usage qualified for offline charging, and another part uses real-time or online charging. This can be the case where all voice calls for the user are post-paid, while all data sessions are pre-paid. Or, when all 9-5 calls are post-paid, and afterhours calls are pre-paid.

Figure 3:
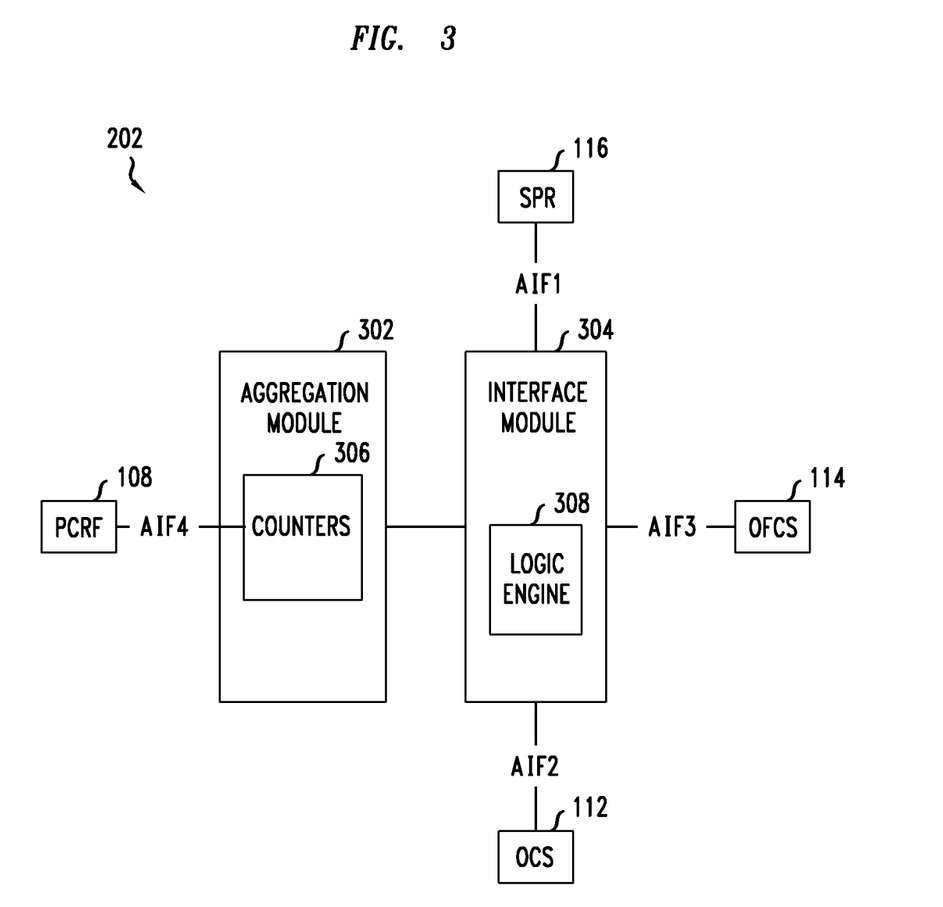
FIG. 3 is a diagram illustrating the Aggregation Integration Function of FIG. 2.

The embodiment shown in FIG. 3 is for a situation when a UE is not roaming. One of ordinary skill in the art would be capable of extending to situations when a UE is roaming. In case of roaming, AIF 202 may be implemented across the home and visited network.

An embodiment of AIF 202 is shown in FIG. 3. AIF 202 includes two main modules, an Aggregation Module 302 and an Interface Module 304. Aggregation Module 302 provides running aggregates of the quota consumed on a per subscriber basis within each billing cycle. The aggregates are reset at the beginning of the billing cycle for all subscribers. Depending on the quota that is being monitored, the Aggregation Module 302 would provide one or more counters 306 to track a subscriber's consumption within a billing cycle. In case multiple quotas are being tracked, the Aggregation Module 302 would use multiple counters. This handles the case which can track multiple limits, such as "N1 GB of data download, or N2 hours of connectivity to the network, whichever comes first". The counters may be further deployed to handle individual service data flow, and this would be the case for handling a case like "Unlimited peer-to-peer file transfer, but limit to 1 hour of streaming video a day". Further, counters may have different reset periods depending on quotas and durations associated with them. As shown in the previous use case, a daily streaming video limit is in effect for certain users. Counter management at the Aggregation Module 302 is driven by constituted quota as part of the QCI identified at the SPR. The management of the counters is the responsibility of AIF/Aggregation Module. This management is done on a per-subscriber basis and each subscriber may be associated with multiple counters, potentially each with its own span (daily, or certain hours within each day, or weekly, or monthly, etc.).

A second part of the AIF 202 is Interface Module 304. Interface Module 304 comprises AIF1, AIF2 and AIF3 reference points to SPR 116, OCS 112 and OFCS 114 respectively. Interface Module 304 is necessary to obtain group-related information and influence SPR 116 to modify the QCI associated with a group of subscribers. A group of subscribers may consist minimally of 1 subscriber, or may have more than one subscriber. In addition to these, a second part of AIF2 is responsible for querying the subscriber grouping information. This information is either held at OCS 112, or at an external repository. In the exemplary embodiment, OCS 112 is the owner of this information. When a subscriber starts a session, OFCS 114 and OCS 112 generate Charging Data Records (CDRs). Typically, OCS 112 handles real-time, or pre-paid, charging and OFCS 114 handles offline, or post-paid, charging. In certain cases, subscriber sessions are handled both by OFCS 114 and OCS 112 simultaneously, for example, in a situation where a service provider may enforce an enterprise-wide rule for all voice calls to be part of the post-paid billing type, while allowing streaming sessions only for pre-paid/real-time charging, with or without usage limit implementation. When OCS 112 and OFCS 114, individually or in tandem, generate the CDRs, these are made available to AIF 202, where Aggregation Module 302 either initializes or updates counters 306 associated with the subscriber. Also in response to the CDRs, Interface Module 304 issues a group inquiry to OCS 112 on AIF2. OCS 112 can respond to the query with a list of identifiers (such as MSISDN, or Tel URI, or equivalent) that belong in the same group. For instance, if a group G1 consists of subscribers S1, S2 and S3, when Interface Module 304 issues a query for any of subscribers (S1/S2/S3), OCS 112 would respond with the set of all three subscribers {S1, S2, S3}. This tells AIF 202 that the concept of group is applicable for any of (S1/S2/S3) and the used up quota must be counted against the group usage.

Interface Module 304 also includes a logic engine 308 that works with Aggregation Module 302. Logic engine 308 maintains information about thresholds associated with quota consumption limits. These thresholds drive the behavior of the rules engine such that:

Upon reaching a threshold-1, AIF 202 communicates with SPR 116 to downgrade the QoS for individual subscriber or the group of subscribers under a rate plan.

Upon reaching a threshold-2, the AIF 202 communicates with SPR 116 to change the pre-emption priority of a service for a subscriber or group of subscribers under a rate plan.

Upon reaching a threshold-3, the AIF 202 communicates with SPR 116 to change the services allowed to a subscriber or a group of subscribers under a rate plan.

Upon reaching the beginning of a billing cycle, the AIF 202 resets the internal counters and communicates with SPR 116 to restore the subscriber or group of subscribers to their original subscription levels, which includes the QoS, pre-emption priority for the services, and a list of allowed services, among other things. In an alternative embodiment, AIF 202 may selectively reset counters to abide by different billing cycles associated with different services received by the subscribers connecting to different APNs.

In an alternative embodiment, AIF 202 can push aggregated subscriber or group users' usage quantum data to PCRF 108 to directly downgrade the QoS, change the pre-emption priority of a service, or change the service allowed for individual subscriber or the group of subscribers.

The communication with SPR 116 happens by means of Interface Module 304. Any modifications done on SPR 116 are communicated to PCRF 108, and PCRF 108 would in turn dynamically communicate the new rules or the modified rules to PCEF 102 for implementation, including both of offline and online charging. This means that an ongoing session with multiple service data flows is subject to change via this chain of changes. It also means that the initial policy decision made at PCRF 108 for new sessions would account for the new/modified permissions when a new IP-CAN session establishment is attempted by a user, either individually or as a user within a group.

PCEF 102 optionally sends a notification to the end user with policy changes (QoS, services, etc.), and if the end user has a right to negotiate the policies and services, PCEF 102 can carry the end-user request/input to PCRF 102 to alter the policy.

For use with OCS 112, the modifications in the rules affect the sessions immediately. For OFCS 114, because of its near real-time nature, the changes in the rules come into play in under a minute. In either case, when thresholds are reached in the middle of a session, PCRF 108 would be triggered to modify the operational policy for a user (individual or a group user).

In an exemplary embodiment, AIF 202 may be implemented as part of the Billing Mediation system as further defined in 3GPP TS 32.240. The standard model for 3GPP specifications defines interfaces and reference points between the billing domain and both OFCS 114 and OCS 112. Billing Mediation is part of the billing domain. The logical function enhancement on the Billing Mediation is Aggregation Module 302 of AIF 202. When embodied as an enhancement on the Billing Mediation functionality, AIF2 and AIF3 can follow the Bx reference point in parts because the Bx reference point is used by OCS 112 and OFCS 114 to transport the CDR files over to the Billing Mediation using standard FTP/FTAM protocol.

Next, the operation of Interface Module 304 and Aggregation Module 302 to initialize counters and create group counters will be described in conjunction with FIG. 4.

Figure 4:
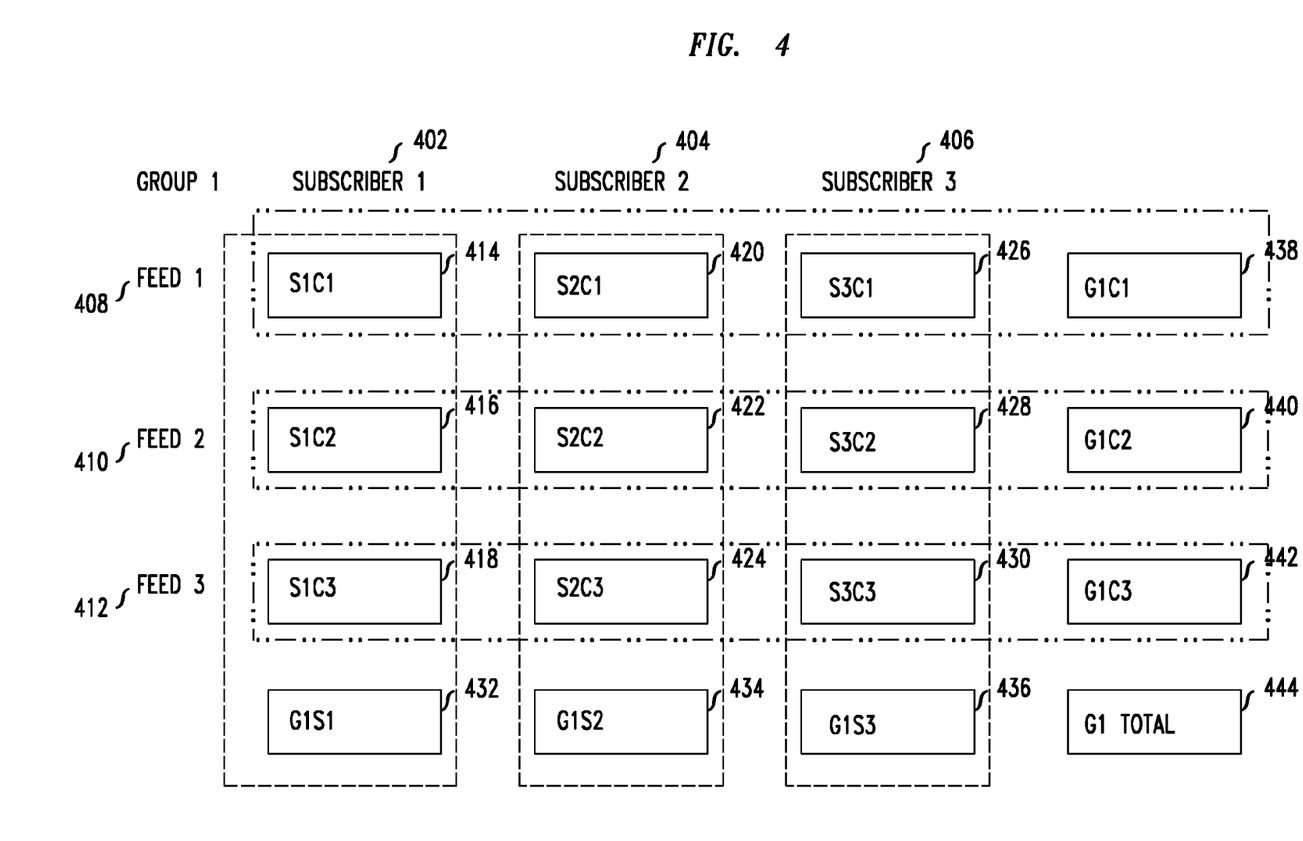
FIG. 4 is a diagram illustrating counters within the Aggregation Integration Function.

A set of counters for a Group (G1) of three subscribers is shown in FIG. 4. A group is not limited to 3 subscribers but may have any number as determine by a service provider. Individual subscribers 402, 404 and 406 may each subscribe, for example, to 1 or more feeds 408, 410, and 412. Three feeds are shown in FIG. 4 but any number of feeds would be possible. A feed may be a video session, or peer-to-peer file sharing, or accessing a particular server on port 80, or using FTP across all servers out there, in other words, a service data flow.

Counter 414 is used to count the data consumption of Subscriber 1 from Feed 1 and is marked S1C1. Similarly, counter 416 tracks the data consumption of Subscriber 1 from Feed 2, etc. Each user is associated with one or more counters that maintain usage data for a certain type of use or time period. In FIG. 4, counters 414, 420 and 426 may track daily video streaming use, while counters 416, 422 and 428 may track gaming applications and counters 418, 424 and 430 may track normal web traffic other than video stream and gaming applications, for example. Of note is the fact that the usage tracking is a derivative of the PCC rules constituted by the Service Providers. The uses defined above for the counters are representative and additional uses would be apparent to one of ordinary skill in the art.

The AIF counters for a Group also keep track of aggregate data consumption. In FIG. 4, Counter 432 counts the aggregate data usage for Subscriber 1, the sum of counters 414, 416 and 418. Similarly, counters 434 and 436 count the aggregate usage for Subscribers 2 and 3 respectively. Counter 438 counts the data consumption of Feed 1 by all subscribers in Group 1, while counters 440 and 442 count the data consumption of Feed 2 and Feed 3 respectively. Counter 444 provides an aggregate of all counters tracking Group 1. Each counter in FIG. 4 may have its own quote limit.

The counters shown in FIG. 4 provide an example of how data consumption by a group of subscribers can be monitored. More generally, any arrangement of counters which can track the following usages may be provided:

On a per user basis, how much has the user consumed on different feeds? (414-430 in FIG. 4)

On a per feed basis, what is the consumption per user basis e.g., how much have S1, S2 and S3 consumed from Feed 1, 2 or 3? (438, 440 and 442 in FIG. 4)

On a per group basis, what is the consumption across the subscribers of the group? (432, 434 and 436 in FIG. 4)

The counters are constructed as per monitoring policies to be used in a deployment by a service provider. Therefore, there is no specific significance attached to an individual counter except its need to tabulate the individually monitored metrics, which can have service flow level granularity at the PCEF level. In an LTE network, the PDN Gateway (PGW) implements the PCEF and communicates via Rf interface with the OFCS, where it reports quota consumption post-facto, or via Ro interface to OCS, where quota is granted prior to usage, and re-authorization and quota re-allocation becomes necessary as the granted quota depletes.

The tracking of individual as well as group level consumptions allows the AIF/Aggregation to keep track of consumptions that can support flexible rules. For example, a service provider may ask for curtailing video streaming at a group level, but providing for an exception to a specific user within the group. In another example, one subscriber in a group may reach a quota of 100 MB consumption in a billing period, but the service provider can let this subscriber borrow from another subscriber within the same group who has not reached a quota.

From AIF 202, SPR 116 and PCRF 108, QoS throttling control is determined based on subscriber data and also network conditions, such as:

Subscriber profile and charging rules

Subscriber dynamic interaction (subscriber may request QoS remains the same after receiving the notification)

Subscriber history data (customer loyalty, like an excellent customer for a while)

Data service type

Data tariff type

Data volume (like download volume, if download nears the end, service provider may allow the same QoS without throttling)

Network bandwidth (if it is off-peak time, the service provider may allow the same QoS without throttling)

Home/roaming condition

Location

Access types

Switching between prepaid and postpaid

Grace period

Some network data is fed from the PCEF 102 to the PCRF 108, including, but not limited to traffic info, location, application/service detected for the determination above.

Figure 5:
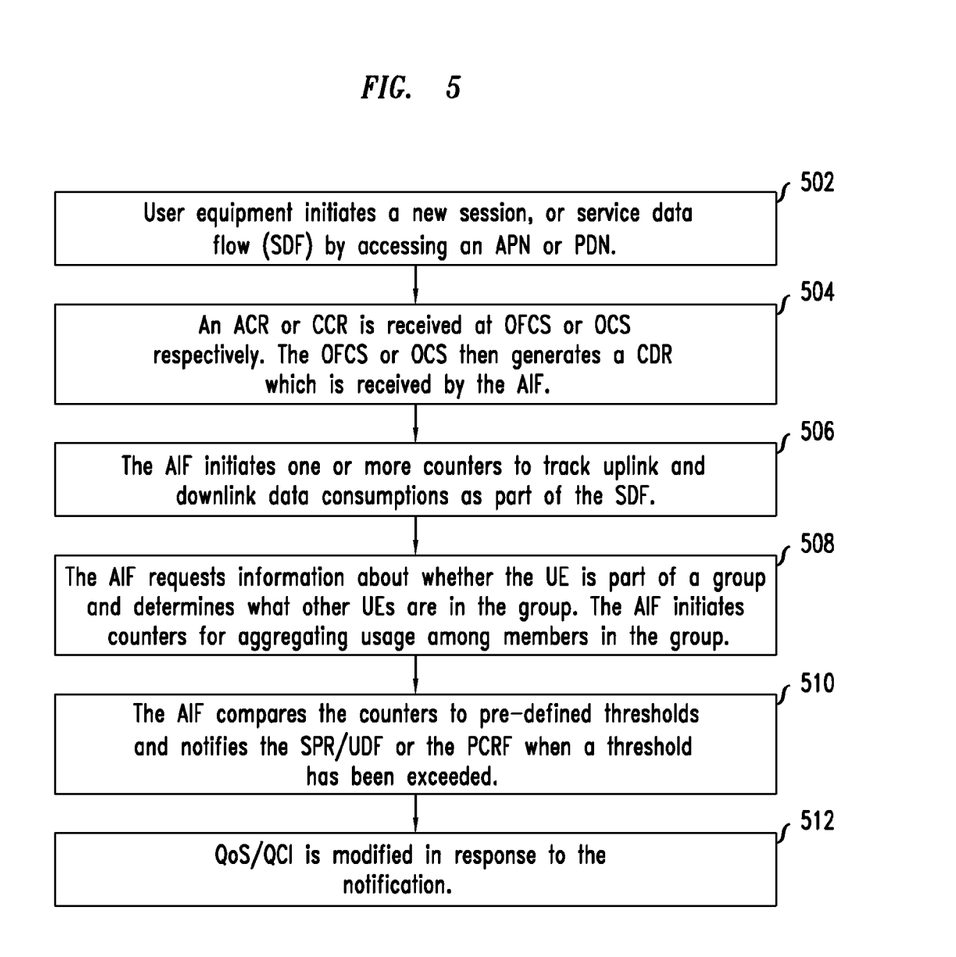
FIG. 5 is a flowchart illustrating the operation of the embodiment shown in FIGS. 2-4.

The operation of a preferred embodiment is shown in connection with the flowchart of FIG. 5. In step 502, a subscriber using a user equipment initiates a data session, or service data flow (SDF) by accessing an Access Point Name (APN) or Packet Data Network (PDN). In response, an Offline Charging System (OFCS) or Online Charging System (OCS) receives an Accounting Request (ACR) or a Credit-Control Request (CCR) respectively then generates a Charging Data Record (CDR) in step 504. The CDR is received by the Aggregation Integration Function (AIF) which initiates one or more counters to track the service data flow in step 506. The AIF also requests information about whether the UE is part of a group or not in step 508 and if so, initiates one or more counters for tracking group data usage. The counters are periodically updated during the data session/SDF by additional ACRs. The AIF compares all counters to pre-defined thresholds and notifies the Subscriber Profile Repository/User Data Repository (SPR/UDF) when a threshold is exceeded in step 510. Finally, the QoS experienced by the one or more UEs in the group is modified in response to the notification in step 512.

The apparatus in FIGS. 2-3 in one example comprises a plurality of components such as one or more of electronic components, hardware components, and computer software components. A number of such components can be combined or divided in the apparatus. An example component of the apparatus employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for providing quality of service (QoS) control in a telecommunications network, said method comprising the steps of:
   detecting a new service data flow (SDF), initiated by a user equipment (UE), in the telecommunications network;
   requesting information regarding membership of the UE in a group;
   initializing one or more counters to monitor telecommunications network usage by the initiating UE and any other UEs in the same group;
   collecting telecommunications network usage data by the initiating UE and any other UEs in the same group in the one or more counters;
   comparing the one or more counters to pre-defined thresholds, and sending a notification to a user profile repository when the one or more counters reaches a pre-defined threshold; and
   changing QoS when any pre-defined threshold of the one or more counters is reached by updating a QoS Class Identifier (QCI) in the user profile repository in response to the notification,
   wherein the telecommunications network is an LTE network having a Subscriber Profile Repository (SPR) or a UDR, a Policy and Charging Rules Function (PCRF), an Online Charging System (OCS) and an Offline Charging System (OFCS) which interact to provide QoS, gating control and billing data for subscribers using the telecommunications network.

2. The method of claim 1 wherein the step of detecting a new SDF further comprises the step of executing the policy defined at a Policy and Charging Rules Function (PCRF) and executed at a Policy and Charging Enforcement Function (PCEF), such that an SDF is uniquely identified for usage tracking via establishing a service data container at the PCEF to track the uplink and downlink data consumptions and communicating with an Offline Charging System (OFCS) or an Online Charging System (OCS) periodically via sensing an accounting request (ACR) carrying the consumed quota associated with the container in the SDF.

3. The method of claim 1 wherein the step of changing QoS further comprises sending a notification that a threshold has been reached to the SPR or the PCRF.

4. The method of claim 1 wherein the pre-defined thresholds are selected by a subscriber and maintained by a service provider of the telecommunications network.

5. A method for providing quality of service (QoS) control in an LTE wireless telecommunications network, said method comprising the steps of:
   receiving a Charging Data Record (CDR) from an OFCS or an OCS, said CDR generated in response to an Accounting Request (ACR) or Credit-Control Request (CCR), said CDR indicating a new service data flow (SDF) for a first user equipment (UE) on the LTE network;
   requesting information regarding membership of the first UE in a group;
   if the requested information indicates that the first UE is in a group, receiving a list of one or more additional UEs in the group;
   initializing one or more counters to monitor LTE network usage by the first UE and the one or more additional UEs in the group;
   if another CDR is received for the SDF, updating the appropriate counter of the one or more counters monitoring the one or more UEs in the group;
   comparing the one or more counters to pre-defined thresholds;
   notifying a user profile repository when any pre-defined threshold of the one or more counters is reached; and
   changing the QoS for the one or more UEs in the group in response to notifications,
   wherein the counters are reset at the beginning of a billing cycle; and
   wherein the LTE network has a Subscriber Profile Repository (SPR), a Policy and Charging Rules Function (PCRF), an Online Charging System (OCS) and an Offline Charging System (OFCS) which interact to provide QoS, gating control and billing data for subscribers using the LTE network.

6. The method of claim 5 wherein the one or more counters may be flexibly assigned to monitor LTE network usage by a single UE in the group via a single SDF.

7. The method of claim 6 wherein one or more of the counters may be flexibly assigned to monitor LTE network usage by a plurality of UEs in the group via a single SDF.

8. The method of claim 6 wherein the one or more counters may be flexibly assigned to monitor LTE network usage by a single UE in the group to a plurality of SDFs.

9. The method of claim 5 wherein the pre-defined thresholds are selected by a subscriber and maintained by a service provider of the telecommunications network.

10. The method of claim 5 wherein the CDRs are received from the OCS and the OFCS, and the notifying step further comprises sending a notification that a pre-defined threshold has been reached to the SPR or the PCRF.

11. An apparatus for providing quality of service (QoS) control in a telecommunications network coupled to one or more user equipments (UEs), said apparatus comprising:
   an aggregation module for receiving a notification of a new or continuing data session by one of the UEs;
   an interface module for accessing information which indicates whether the UE which generated the notification is part of a group of UEs and communicating the group information to the aggregation module; and
   one or more counters which are initialized or updated by the aggregation module, in response to the notification, to track the data session and the information from the interface module, said counters associated with one or more quotas;
   wherein said aggregation module informs said interface module when a counter has reached its associated quota, thereby changing the QoS experienced by the UE,
   wherein the telecommunications network is an LTE network further comprising:
   a Subscriber Profile Repository (SPR);
   a Policy and Charging Rules Function (PCRF);
   an Online Charging System (OCS); and
   an Offline Charging System (OFCS); and
      wherein the interface module sends a notification to a user profile repository when a counter reaches a pre-defined threshold;
   the user profile repository updates a QoS Class Identifier (QCI) in response to the notification; and
   the CDRs are received from the OCS and the OFCS, and changing QoS is performed in the SPR or the PCRF.

12. The apparatus of claim 11 wherein the notification of a new or continuing data session further comprises a charging data record (CDR) associated with a session.

13. The apparatus of claim 11 wherein the pre-defined thresholds are selected by a subscriber and maintained by a service provider of the telecommunications network.

* * * * *